United States Patent [19]

Kyrtsos

[11] Patent Number: 5,668,529
[45] Date of Patent: Sep. 16, 1997

[54] METHOD OF STATISTICALLY DETERMINING BRAKE LINING WEAR USING TEMPERATURE SENSING

[75] Inventor: Christos T. Kyrtsos, Southfield, Mich.

[73] Assignee: Eaton Corporation, Cleveland, Ohio

[21] Appl. No.: 660,680

[22] Filed: Jun. 5, 1996

[51] Int. Cl.$^6$ ............................................... B60Q 1/00
[52] U.S. Cl. .................... 340/454; 340/453; 324/700; 324/716; 374/135; 374/153
[58] Field of Search ........................ 340/454, 453, 340/449; 324/700, 716, 542; 73/129, 130; 192/30 W; 374/110, 135, 153; 116/208, 216; 188/1.11; 200/61.44

[56] References Cited

U.S. PATENT DOCUMENTS

| | | | |
|---|---|---|---|
| 3,975,706 | 8/1976 | Kato | 340/449 |
| 4,520,661 | 6/1985 | Tamai et al. | 374/148 |
| 4,674,326 | 6/1987 | Reinecke | 73/129 |
| 4,824,260 | 4/1989 | Novotny et al. | 188/1.11 |
| 4,882,564 | 11/1989 | Monroe et al. | 340/449 |
| 5,079,947 | 1/1992 | Feldmann et al. | 73/129 |
| 5,302,940 | 4/1994 | Chen | 188/1.11 |
| 5,347,858 | 9/1994 | Ito et al. | 73/129 |

*Primary Examiner*—Jeffery Hofsass
*Assistant Examiner*—John Tweel, Jr.
*Attorney, Agent, or Firm*—Loren H. Uthoff, Jr.; Howard D. Gordon

[57] ABSTRACT

A method to estimate the thickness of a brake lining based on the periodic sampling of the output of a temperature sensor embedded in the brake lining. A temperature histogram is created which is compared to calibration histograms stored in an electronic processing unit to yield an estimated brake lining thickness which is transmitted to the vehicle cab or to another on-board electronics unit. A brake wear factor is calculated from the temperature histogram by multiplying the average value of each temperature range by the frequency of occurrence and then summing the results.

5 Claims, 3 Drawing Sheets

METHOD OF STATISTICALLY DETERMINING BRAKE LINING WEAR USING TEMPERATURE SENSING

RELATED APPLICATIONS

The present application relates to patent application U.S. Ser. No. 8/592,278 entitled "Method of Brake Lining Wear Detection Using Temperature Sensing" filed on Jan. 26, 1996 and assigned to the same assignee, Eaton Corporation, as this application.

BACKGROUND OF THE INVENTION

1. Field of the Invention

The present invention relates to a method of determining brake lining wear. More specifically, the present invention relates to a method of determining brake lining wear using a statistical histogram of brake lining temperature.

2. Description of the Prior Art

Various brake lining wear detection systems are known in the art. In addition, temperature measurement systems are known, although very few methods are known which combine the capability of detecting brake wear along with detecting the operating temperature of the brake lining. U.S. Pat. No. 5,419,415, the disclosure of which is incorporated herein by reference, discloses an apparatus for monitoring the operating temperature and providing a signal when an elevator brake lining reaches a service wear point. An electrically conductive wire loop and a temperature sensitive resistor are disposed within the brake lining. Monitoring the resistance of the temperature sensitive resistor yields a signal which represents the operating temperature of the brake lining so that extreme temperature conditions can be detected and corrective action taken. Once the electrical conductive loop is worn away, an open circuit is detected which signals the need for lining replacement.

U.S. Pat. No. 4,204,190, the disclosure which is hereby incorporated by reference, describes a brake lining wear detection system where a signal is generated when an embedded conductive wire loop is broken and when electrical contact is made between the wire loop and a brake drum surface thereby indicating the lining wear out point. Likewise, U.S. Pat. No. 3,825,891, the disclosure which is hereby incorporated by reference, describes a brake lining wear sensing system where an electrical circuit signals when an embedded wire loop is broken due to wear of the lining and/or when the wire loop contacts the brake drum. In addition, U.S. Pat. No. 2,494,269, the disclosure which is hereby incorporated by reference, discloses a brake wear and temperature measurement system where a plurality of thermo-responsive elements are disposed within the brake lining where each element is selectively monitored to determine if abnormal temperatures have been encountered and/ or whether the brake lining has worn to such an extent that one or more of the thermally responsive elements have been broken.

U.S. Pat. No. 4,646,001, the disclosure of which is incorporated herein by reference, discloses a resistive array connected to a plurality of conductive strips that are embedded within the brake lining. Each wire is located at a selective height of the brake lining and as each conductive strip is broken due to wear of the brake lining, resistive elements are added to the detection circuit, the brake lining wears, the overall resistance of the resistive array increases. The resistive elements themselves are positioned outside of the brake lining to prevent damage and drift due to temperature changes. No temperature sensing capability is included in this particular system.

A more traditional brake temperature indication means is disclosed in U.S. Pat. No. 1,957,051 where a thermocouple is disposed within the brake lining connected to a display means to indicate operating temperature of the brake lining. A similar technique is used in U.S. Pat. No. 4,520,661 where a combination temperature and wear sensor is disposed in a brake cylinder where the sensor has a slider mechanism that is pressed on the face of a brake cylinder to indicate brake wear and also includes a temperature sensing device thereby indicating the wear of the brake lining and overheating of the brake fluid through a pair of lead out wires.

What is needed in the market is an inexpensive and reliable method of measuring brake wear by monitoring brake temperature using one sensor and a processing unit.

SUMMARY OF THE INVENTION

The present invention provides a method of estimating the remaining thickness of a vehicle brake lining based on a histogram of brake lining temperature. A temperature sensing device such as a thermocouple or thermistor is embedded in the brake lining preferably near the depth that would constitute the point of the brake lining service limit. The temperature sensor is electrically connected to a processing unit for recording the lining temperature at periodic time intervals for assembly of a temperature histogram for calculation of a remaining lining thickness. The brake lining temperature is sampled at a predetermined time interval with temperatures that fall below a threshold value being disregarded in creating the temperature histogram. If the temperature is relatively low, indicating that the brake has not been applied, the temperature data is ignored and higher temperature data is logged until the number of samples reaches a minimum number whereupon the latest data replaces the earlier data for use in wear calculations. As the brake temperature increases when the brake is applied, the temperature sensor output is used by the processing unit to assemble a temperature histogram. Assuming that the braking events represent some type of average brake pressure history, calibration of the particular lining material would enable the calculation of a brake lining thickness based on the shape of the histogram and/or on a wear factor representing the area under the histogram curve. As the brake lining becomes worn, the time at higher temperatures would increase and the histogram of brake temperature would change shape to shift toward higher and higher temperatures. This change in shape can be used to estimate the remaining lining thickness. Also, the areas under the histogram curve can be used to estimate the remaining lining thickness.

One provision of the present invention is to provide a method of estimating the thickness of a brake lining based on the temperature history of the lining.

Another provision of the present invention is to provide a method of estimating the thickness of a brake lining based on a temperature histogram of the lining.

Still another provision of the present invention is to provide a method of estimating the thickness of a brake lining based on lining temperature measurements which are relayed to a processing unit which uses a histogram analysis technique to estimate the remaining lining thickness.

DETAILED DESCRIPTION OF THE PREFERRED EMBODIMENT

Figure 1:
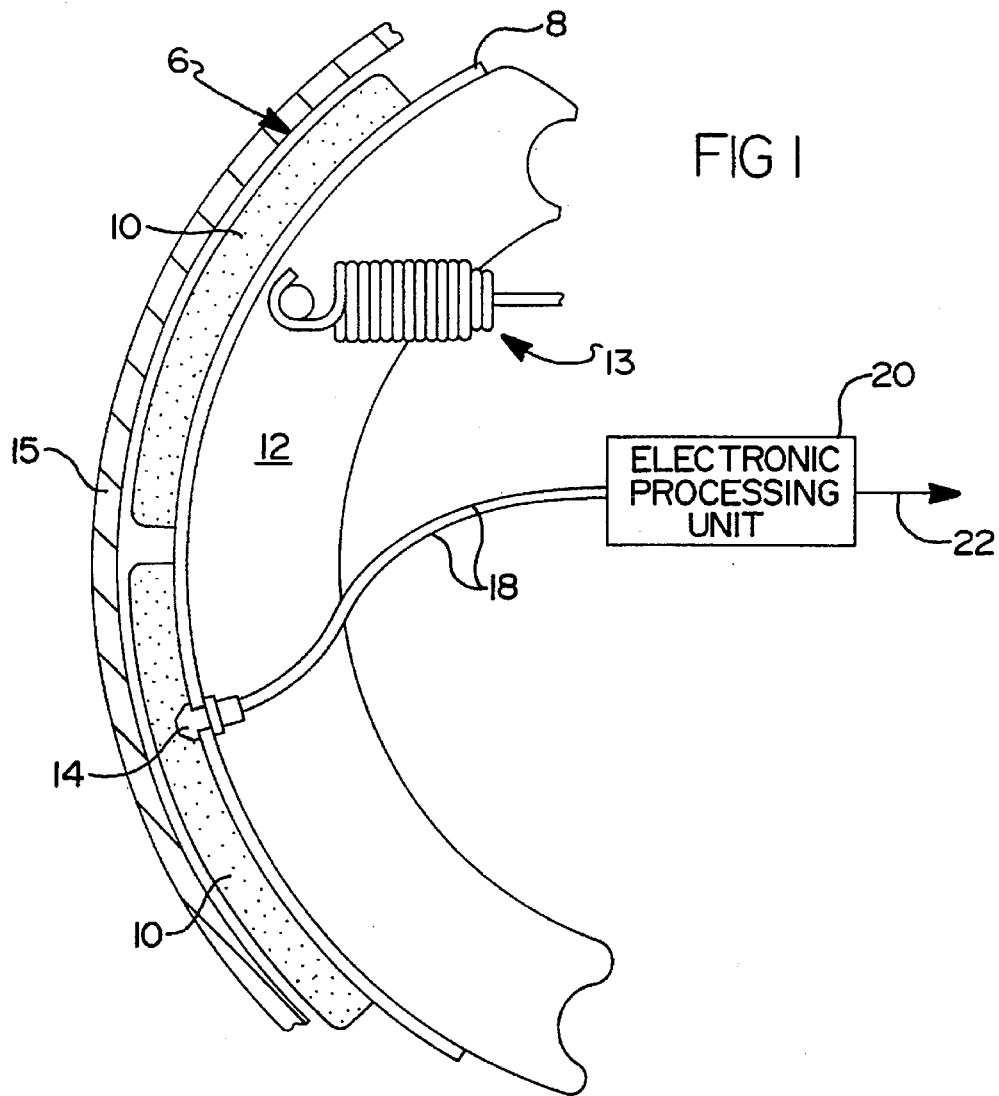
FIG. 1 is a partial cross-sectional view of the present invention showing a temperature sensor embedded in a brake lining.

For purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Now referring to FIG. 1 of the drawings, a partial cross-section of the temperature monitoring and brake lining wear estimation system of the present invention is shown. A brake shoe 6 has a temperature sensor 14 embedded in the brake lining 10. The lining 10 is riveted or bonded to a brake table 8 when the brake table 8 is in turn attached to and supported by the brake web 12. A return spring 13 functions to return the brake shoe 6 into a retracted position upon deactivation of the brake such that the brake lining 10 no longer contacts the brake drum 15. The temperature sensor 14 can utilize any type of suitable sensing element such as a thermocouple or a thermistor which is electrically connected by way of connection wires 18 to an electronic control unit 20. The electronic control unit 20 processes the signals generated by the temperature sensor 14 to interpret the output and generate an output signal on line 22 which represents the thickness of the brake lining 10 and/or the temperature of the lining 10.

The temperature sensor 14 is radially positioned in the brake lining 10 such that temperature sensor 14 only extends to just below the service limit thickness of the brake lining 10. In the alternative, the temperature sensor could extend slightly beyond the service limit thickness of the brake lining 10 to the extent that the resistance of the temperature sensor 14 greatly increases or decreases when the brake wear results in damage to the electrical circuit of the temperature sensor 14 thereby signaling that the brake lining 10 service limit has been reached.

Figure 2:
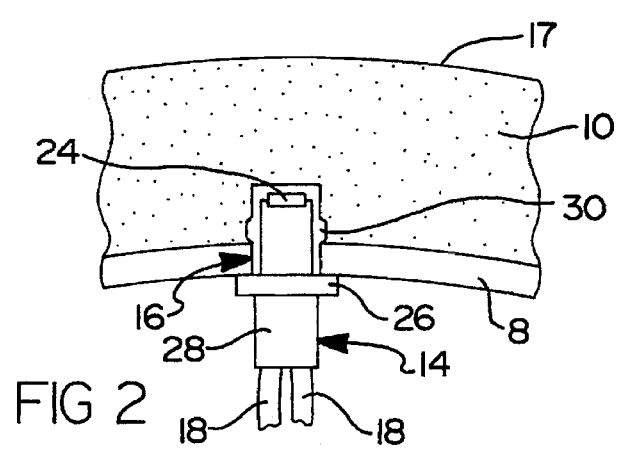
FIG. 2 is a more detailed embodiment of the temperature sensor shown in FIG. 1

Now referring to FIG. 2, a partial cross-sectional view of the temperature sensor 14 mounted to the brake table 8 is shown. A sensing element 24 portion of the temperature sensor 14 is embedded in the brake lining 10. The sensing element 24 is shown as a type commonly known as a Positive Temperature Coefficient (PTC) thermistor which changes its electrical resistance value in response to changes in temperature. To secure the temperature sensor 14 to the brake table 8, a fastener 26 is used on the inside of the brake table 8 and a ring portion 30 is positioned on the outside of the brake table 8 thereby securing the temperature sensor 14 to the brake shoe 6.

The brake lining 10 is molded around the temperature sensor 14 and retains the sensor 14 in position along with the fastener 26 and the ring portion 30. The brake lining 10 is bonded or riveted to the brake table 8 where the temperature sensor 14 is inserted through an aperture 16 formed in the brake table 8 and secured using fastener 26. The connection wires 18 are electrically connected to sensing element 24 and are potted into the sensor housing 28 for sealing from the environment. The sensor housing 28 provides a secure means for mounting of the sensing element 24. The sensing element 24 is preferably a PTC type of thermistor which changes resistance with temperature although any type of suitable temperature sensing technology which senses the temperature of the brake lining 10 at a location adjacent to the brake table 8 could be utilized in the present invention.

Essentially, the length of the sensing element 24 is selected such that it extends into the brake lining 10 only to the extent that a brake service lining wear condition occurs as the sensing element 24 changes electrical characteristics due to damage due to contact with the brake drum 15. Thus, the resistance value of the temperature sensor 14 changes in response with changes in the brake lining 10 temperature until the brake lining 10 wears to the point that the sensing element 24 contacts and is electrically damaged by the brake drum 15 thereby dramatically signaling the need for replacement of the brake lining 10 by providing a very high or low resistance signal to the electronic processing unit 20.

Figure 3:
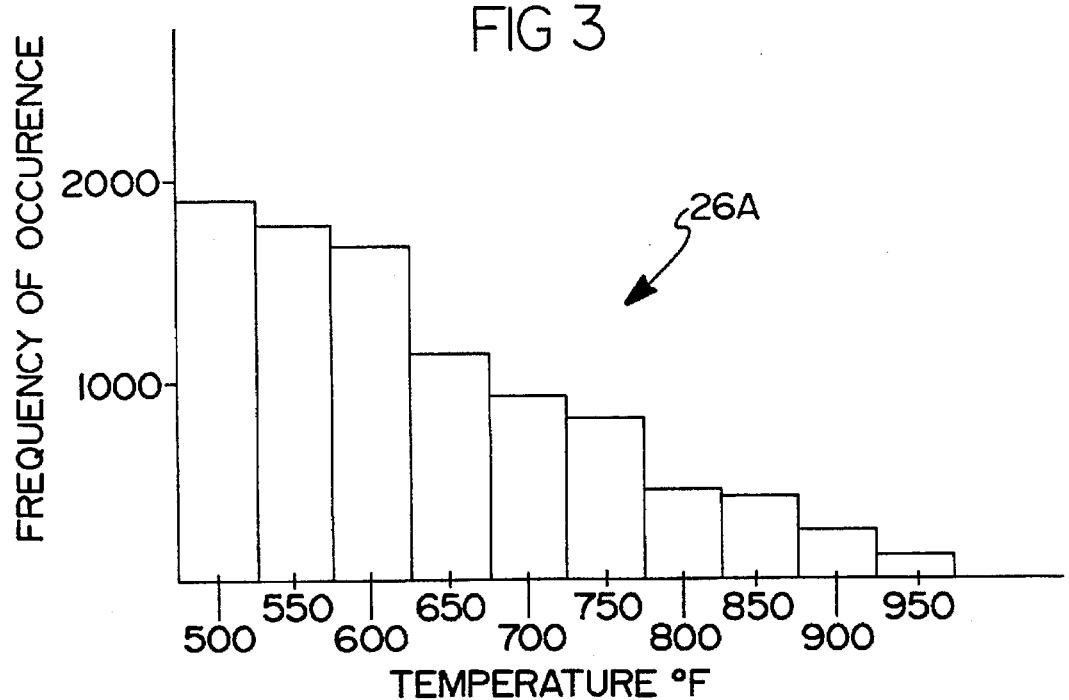
FIG. 3 is a temperature histogram of the present invention generated with a thick lining.
Figure 4:
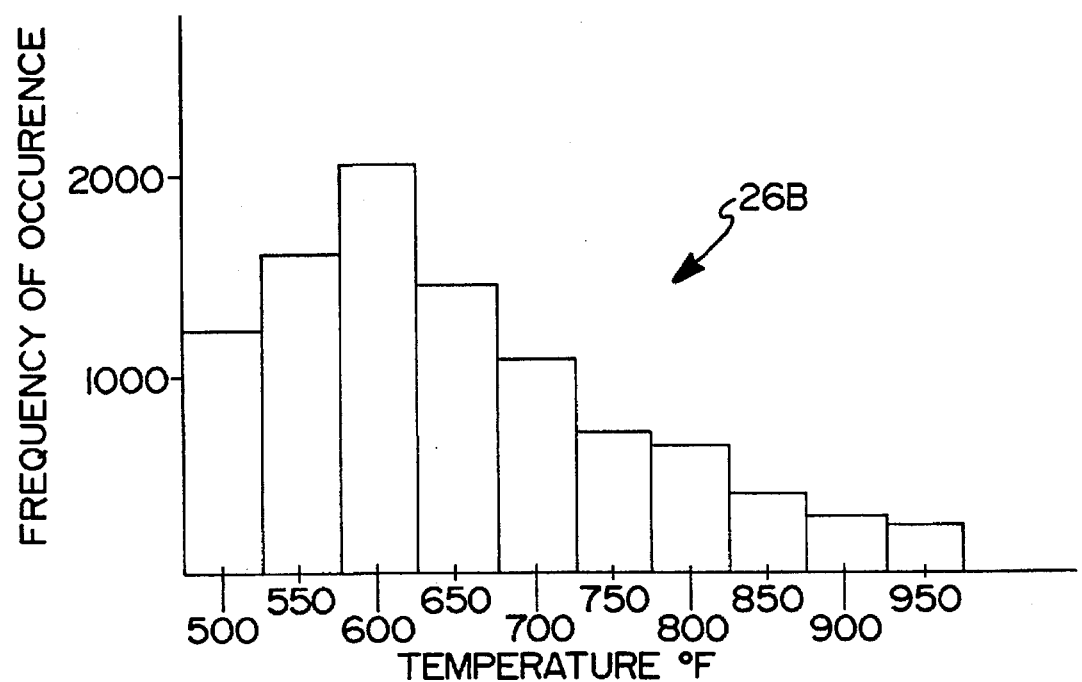
FIG. 4 is a temperature histogram of the present invention generated with a partially worn lining.
Figure 5:
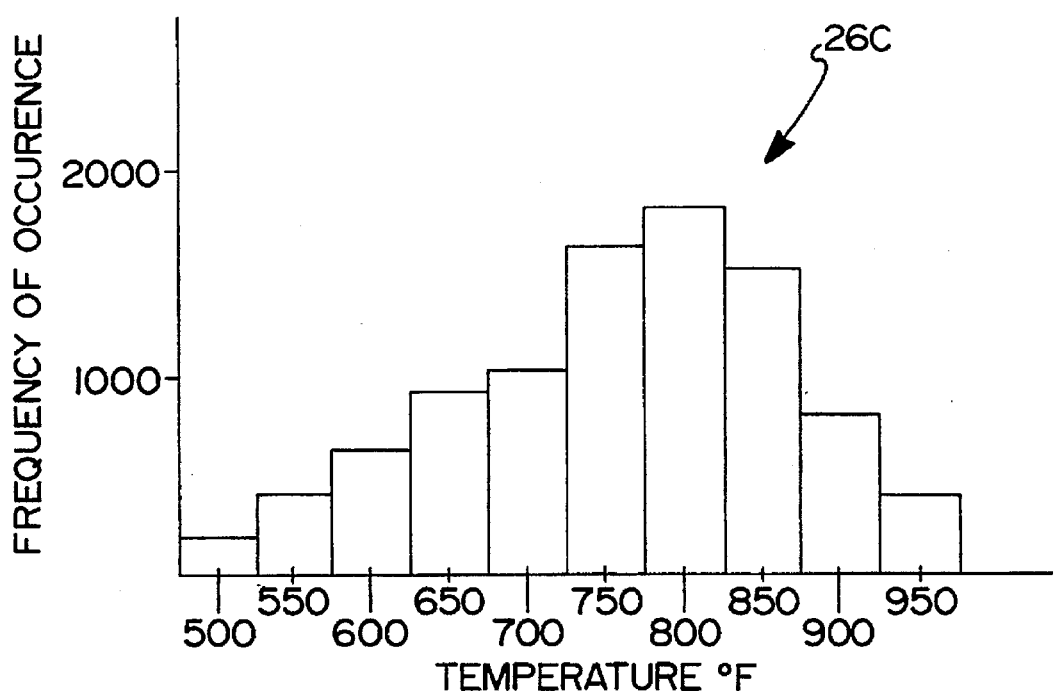
FIG. 5 is a temperature histogram of the present invention generated with a thin lining.

FIG. 3 illustrates the temperature histogram 26 formulated based on the temperature information calculated by the electronic processing unit 20 for a relatively new brake lining 10 having a relatively thick cross section. The temperature of the brake lining 10 is periodically sampled irrespective of the operation of the brake where measured temperatures that fall below 500° F. are discarded. The temperature histogram 26 is then formed based on the temperature data where the frequency of occurrence is plotted versus each temperature range selected for later calculation of the thickness of the brake lining 10. Over time, the vehicle operator typically activates the braking system around the same average level. Thus, on a statistical basis, the shape of the histogram 26 represents the thickness of the brake lining 26 where a high frequency of occurrence at a relatively low temperature indicates a relatively thick brake lining 10 thickness while the shape of the histogram 26 shifts toward higher temperatures as the brake lining 10 decreases in thickness due to wear as illustrated in FIGS. 4 and 5.

After a select number of periodic temperature samples are collected, then the histogram 26 is updated with new temperature data. In the case shown in FIGS. 3, 4 and 5, some 10,000 periodic samples which exceed 500° F. are taken and then continuously updated when the vehicle is being driven to form the temperature histogram 26A. The 10,000 samples could take months to accumulate initially. For example, a temperature sample would be taken by the electronic processing unit every minute of vehicle operation. All samples which exceed the 500° F. threshold are logged and used to update the histogram 26A. Only 10,000 samples are used to form the temperature histogram 26A so the oldest samples are replaced by the newest samples. In other words, a sample is taken every minute the vehicle is in operation. If the sample temperature exceeds 500° F., it is saved and added to the temperature histogram 26A while the oldest sample is discarded assuming 10,000 samples have been stored.

Calibration information is loaded into the electronic processing unit 20. Calibration information can consist of the shape of the histogram for various thicknesses of the brake lining 10 and/or areas under the histogram for various thicknesses of the brake lining. This calibration information is used for comparison with the histogram 26A to determine an estimated thickness of the brake lining 10. Calibration histogram shapes can be entered and stored in the electronic processing unit depending on the particular vehicle attributes, route driven and other variables that would make the wear calculations more accurate.

Another method to determine a more accurate relationship between the shape of the histogram and the brake lining thickness is to visually inspect the brake to determine the remaining thickness of the lining. The remaining lining thickness is then entered into the electronic processing unit 20 for later reference when the subsequent lining is installed and produces this particular histogram shape.

FIG. 4 illustrates the temperature information accumulated by the electronic processing unit 20 based on the operating temperatures of a partially worn brake lining 10. The shape of the temperature histogram 26B has been shifted toward higher temperatures as compared to FIG. 3 which is interpreted as a partially worn brake lining 10 by the electronic processing unit 20 based on the stored calibration information. An output signal representing the estimated remaining brake lining thickness is transmitted on line 22 to another electronic unit or to a display unit in the vehicle cab. It would also be possible to display the actual temperature histogram 26A, 26B or 26C on an LED type of display panel in the vehicle cab such that the operator could make the decision on when brake maintenance was required. The operator could monitor the changing shape of the temperature histogram 26B and compare the shape to a calibration standard and determine on that basis the remaining brake lining 10 and if maintenance was required.

FIG. 5 illustrates the temperature information calculated by the electronic processing unit 20 based on the operating temperature of a brake lining 10 that has nearly reached its wear limit. The shape of the temperature histogram 26C has been shifted further rightward toward ever higher temperatures due to the decrease in the thickness of the brake lining 10. The thinner the brake lining 10, the faster the brake lining 10 is heated to a given temperature due to frictional heating. Also, the thinner the brake lining 10, the higher the maximum temperature that will be reached for a given braking event.

One method of mathematically calculating a wear factor (WF) representing the remaining brake lining 10 thickness is to multiply the frequency of occurrence by the average temperature for each histogram bar and then summing of the results which, in essence, represents the area under the histogram. Note that only those temperatures over a preselected level are used for assimilating the temperature histograms. For example, the WF for the temperature histogram shown in FIG. 3 is $58.4 \times 10^5$, the WF for the temperature histogram shown in FIG. 4 is $62.5 \times 10^5$ and the WF for the histogram shown in FIG. 5 is $69.8 \times 10^5$. Thus, as the lining thickness decreases, the WF increases and can be used to signal the driver or other on-board electronics of the rate of wear of the brake lining 10.

Although this invention has been described in its preferred embodiment with a certain degree of particularity, it is understood such description is by way of example only and that certain modifications are possible within the spirit and the scope of the invention as hereinafter claimed.

I claim:

1. A method of estimating the thickness of a brake lining comprising:

providing a temperature sensor disposed to measure an operating temperature of said brake lining;

providing an electronic processing unit electrically connected to said temperature sensor;

providing calibration information stored in said electronic processing unit representing the expected temperature histogram for selected thicknesses of said brake lining;

sensing the temperature of said brake lining;

generating a temperature signal based on the temperature of said brake lining;

transmitting said temperature signal to said electronic processing unit;

sampling said temperature signal in a periodic manner to assimilate temperature samples;

grouping said temperature samples into a plurality of temperature ranges thereby forming a temperature histogram;

comparing said temperature histogram with said calibration information; then outputting a brake wear signal.

2. The method of estimating the thickness of a brake lining of claim 1, further comprising calculating a brake wear factor of a selected number of temperature samples where said wear factor is calculated by multiplying an average value of each temperature range by a corresponding frequency of occurrence from said temperature histogram and summing the results; then calculating a brake lining thickness based on said wear factor.

3. The method of estimating the thickness of a brake lining of claim 1, further comprising calculating a plurality of slopes of said histogram; comparing said slopes to said calibration information; then outputting a brake wear signal.

4. A method of estimating the thickness of a brake lining comprising:

providing a temperature sensor disposed to measure an operating temperature of a brake lining;

providing an electronic processing unit electrically connected to said temperature sensor;

providing a plurality of calibration brake wear factors stored in said electronic processing unit representing the expected brake wear factors for corresponding selected thicknesses of said brake lining;

sensing the temperature of said brake lining;

generating a temperature signal based on the temperature of said brake lining;

sampling said temperature signal in a periodic manner within said electronic processing unit to assimilate temperature samples;

grouping said temperature samples into a plurality of temperature ranges thereby forming a temperature histogram;

multiplying an average value of each temperature range by a corresponding frequency of occurrence from said temperature histogram to yield a wear factor; then calculating a brake lining thickness based on said wear factor.

5. The method of estimating the thickness of a brake lining of claim 4, further comprising:

comparing said wear factor with said calibration information.

* * * * *